US009692659B2

(12) United States Patent
Yu (10) Patent No.: US 9,692,659 B2
(45) Date of Patent: *Jun. 27, 2017

(54) MANAGING MAPPING IN NETWORKS (71) Applicant: HEWLETT PACKARD ENTERPRISE DEVELOPMENT LP, Houston, TX (US)

(72) Inventor: Huijun Yu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,764

(22) Filed: Jan. 6, 2015

(65) Prior Publication Data

US 2015/0124653 A1 May 7, 2015

Related U.S. Application Data (63) Continuation of application No. 14/113,550, filed as application No. PCT/CN2012/075129 on May 7, 2012, now Pat. No. 8,964,770.

(30) Foreign Application Priority Data

Jun. 30, 2011 (CN) .......................... 2011 1 0184425

(51) Int. Cl.
H04L 12/24 (2006.01)
H04L 12/46 (2006.01)
(Continued)

(52) U.S. Cl.
CPC .......... *H04L 41/12* (2013.01); *H04L 12/4641* (2013.01); *H04L 41/0873* (2013.01); *H04L 49/356* (2013.01); *H04L 67/1097* (2013.01)

(58) Field of Classification Search
CPC ... H04L 41/12; H04L 67/1097; H04L 49/357; H04L 41/0873
See application file for complete search history.

(56) References Cited

U.S. PATENT DOCUMENTS 7,466,710 B1 12/2008 Clemm et al.
7,644,179 B1 * 1/2010 Jain et al. ..................... 709/238
(Continued)

FOREIGN PATENT DOCUMENTS

CN 1778076 5/2006
CN 101588365 11/2009
(Continued)

OTHER PUBLICATIONS

CN First Office Action dated Jun. 3, 2013 issued on CN Patent Application No. 201110184425.9 dated Jun. 30, 2011, State Intellectual Property Office, P.R. China.
(Continued)

Primary Examiner — Jung Liu
(74) Attorney, Agent, or Firm — Hewlett Packard Enterprise Patent Department (57) ABSTRACT A method for managing mapping in a network includes: programming mapping relationships between a VSAN and a VLAN of a fabric in advance, which include mapping relationships between VSANs and VLANs programmed in advance for each FCoE switch needed by the fabric; obtaining mapping relationships between the VSANs and the VLANs configured currently for all the FCoE switches of the fabric, when obtained mapping relationships are inconsistent with the programmed-in-advance mapping relationships, automatically updating mapping relationships between the VSANs and the VLANs configured in FCoE switches corresponding to the inconsistent mapping relationships, and/or mapping relationships between the VSANs and the VLANs programmed in advance for the FCoE (Continued)

switches corresponding to the inconsistent mapping relationships.

14 Claims, 6 Drawing Sheets

(51) Int. Cl.
  *H04L 12/931* (2013.01)
  *H04L 29/08* (2006.01)

(56) References Cited

U.S. PATENT DOCUMENTS

| | | | |
|---|---|---|---|
| 8,493,983 B2* | 7/2013 | Rajagopal et al. | 370/395.53 |
| 8,625,595 B2 | 1/2014 | Banerjee | |
| 8,711,864 B1 | 4/2014 | Ko | |
| 2005/0044199 A1 | 2/2005 | Shiga et al. | |
| 2011/0064086 A1 | 3/2011 | Xiong et al. | |
| 2011/0176412 A1* | 7/2011 | Stine | 370/221 |
| 2012/0155469 A1* | 6/2012 | Majumdar et al. | 370/392 |
| 2012/0226801 A1* | 9/2012 | Velaga et al. | 709/224 |

FOREIGN PATENT DOCUMENTS

| | | |
|---|---|---|
| CN | 101651561 | 2/2010 |
| CN | 101795298 | 8/2010 |
| CN | 102111318 | 6/2011 |
| CN | 102316175 | 1/2012 |
| EP | 0944284 A2 | 9/1999 |

OTHER PUBLICATIONS

International Search Report and Written Opinion dated Aug. 23, 2012 issued on PCT Patent Application No. PCT/CN2012/075129 dated May 7, 2012, The State Intellectual Property Office.

Extended European Search Report dated Nov. 24, 2015, EP Patent Application No. 12804415.3 filed May 7, 2012, European Patent Office.

* cited by examiner

MANAGING MAPPING IN NETWORKS

CLAIM FOR PRIORITY

The present application is a Continuation of national stage application number 14/113,550 filed on Oct. 23, 2013, which claims priority to PCT application number PCT/CN2012/075129, having an international filing date of May 7, 2012, which claims priority to Chinese application 201110184425.9 filed on Jun. 30, 2011, the disclosures of which are hereby incorporated by reference in their entireties.

BACKGROUND

With continuous development of Internet applications, information needed to be stored by a network server is growing, and this has caused the storage capacity of the network server to also grow. When the storage capacity of the network server cannot meet the requirement of information growth, the storage of the network server is typically externalized in order to store the information.

Using a Storage Area Network (SAN) to realize the externalization of the storage of the network server is a commonly used technique, and specifically by providing a SAN dedicated external storage environment for the network server. The use of the SAN dedicated external storage environment takes full advantage of new storage hardware and network technology to meet demands, such as storage, access and backup of highly-reliable data with large capacity.

In the SAN dedicated external storage environment, a Fiber Channel (FC) protocol is one of the most widely used protocols, and is applied in the SAN dedicated external storage environment to transmit data based on an FC network. However, a relatively large number of switches, network cards and cables are required to realize the FC network, and this has been known to result in problems, such as high equipment cost, difficulty in maintenance, poor expandability, etc.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
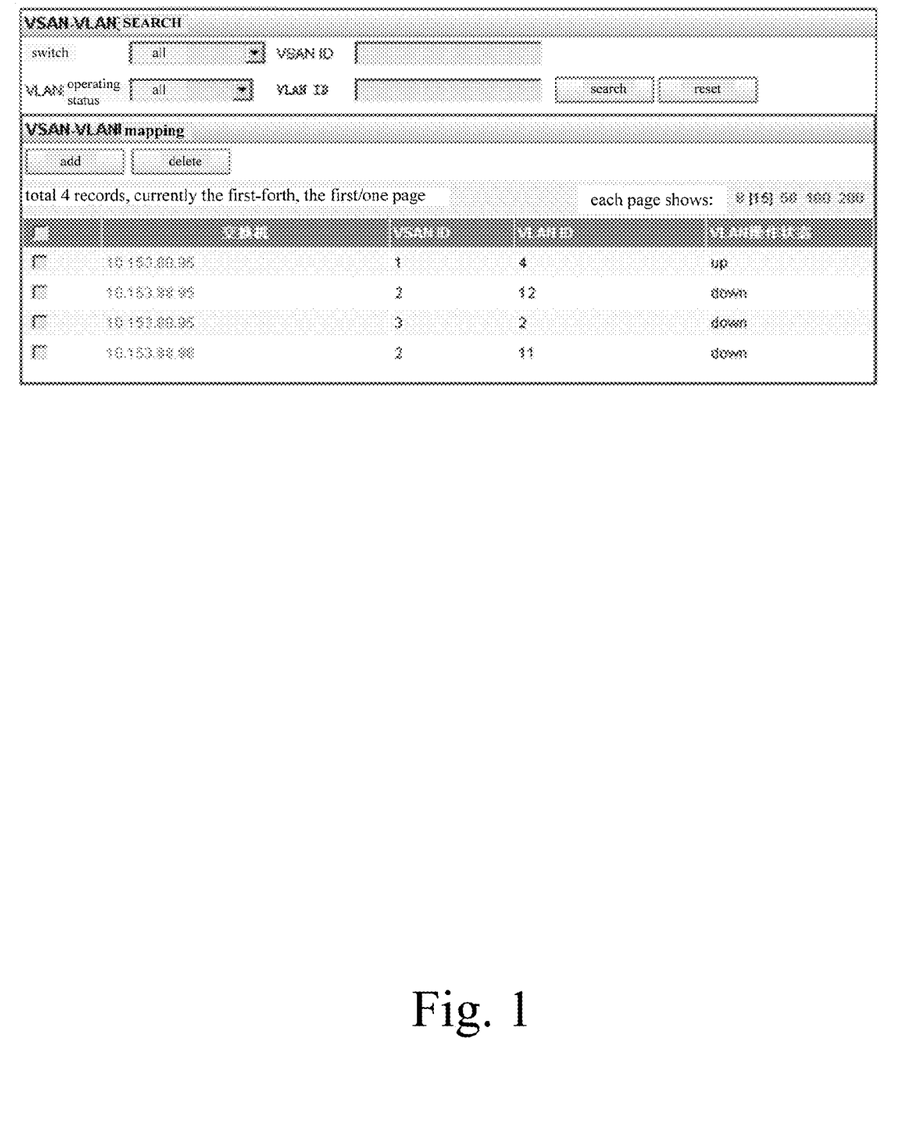
FIG. 1 is a schematic diagram showing mapping relationships between a Virtual SAN (VSAN) and a Virtual Local Area Network (VLAN) of each Fiber Channel over Ethernet (FCoE) switch according to a method for managing mapping in an example.
Figure 2:
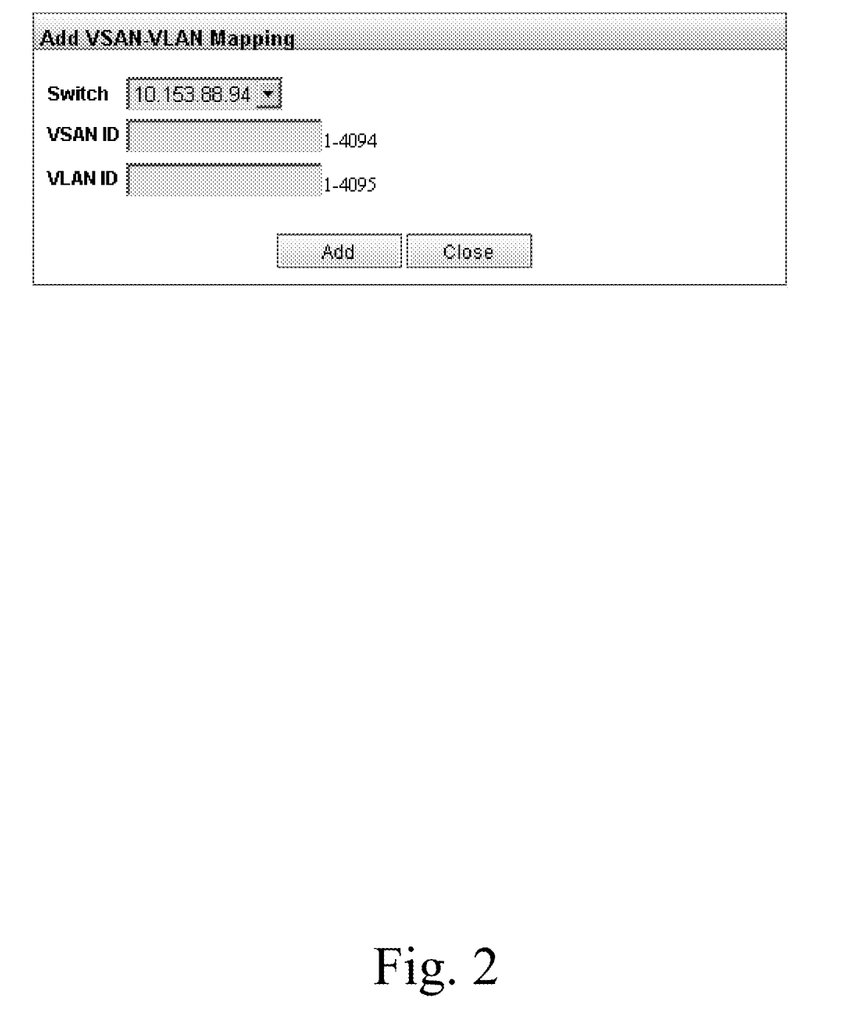
FIG. 2 is a schematic diagram illustrating adding a mapping relationship between a VSAN and a VLAN according to a method for managing mapping in an example.

In an example, Fiber Channel over Ethernet (FCoE) is used to integrate a Storage Area Network (SAN) and a Local Area Network (LAN). In a SAN, there is also a concept of a Virtual SAN (VSAN), which is similar to the concept of a Virtual LAN (VLAN) in a LAN. In the FCoE, the division of a VSAN needs to map with a corresponding VLAN, i.e., there is a corresponding mapping relationship between a VSAN and a VLAN. In the management of the mapping relationship between a VSAN and a VLAN (hereinafter referred to as a method for managing mapping), the mapping relationship between a VSAN and a VLAN of each FCoE switch may be displayed in the form of table, an example of which is shown in FIG. 1. In an example, the method for managing mapping supports adding or deleting a mapping relationship between a VSAN and a VLAN. FIG. 2 shows a schematic diagram of an example of adding a mapping relationship between a VSAN and a VLAN in the FCoE switch.

However, in the above method for managing mapping, a determination as to whether the mapping relationships between the VSANs and the VLANs of the fabric are consistent in all the FCoE switches cannot be determined automatically. Instead, the determination may be made through a user's manually traversing through mapping relationships between the VSANs and the VLANs of all the FCoE switches one by one. When checking whether the mapping relationship between the VSAN and the VLAN of an FCoE switch has been determined, this determination cannot be directly and automatically made. Instead, this mapping relationship may be determined through a user's manually traversing through mapping relationships between the VSAN and the VLAN of the FCoE switch in a table one by one. When a mapping relationship between VSAN and VLAN is to be amended, this amendment may be realized only through a user's manually traversing through each FCoE switch one by one to determine whether any of the FCoE switches is configured with the mapping relationship. If an FCoE switch is determined as being configured with the mapping relationship, then the mapping relationship may be amended.

A method for managing mapping according to another example realizes a unified-management for mapping relationships between the VSANs and the VLANs of all the FCoE switches from a perspective of the fabric to solve the above-problem.

Figure 3A:
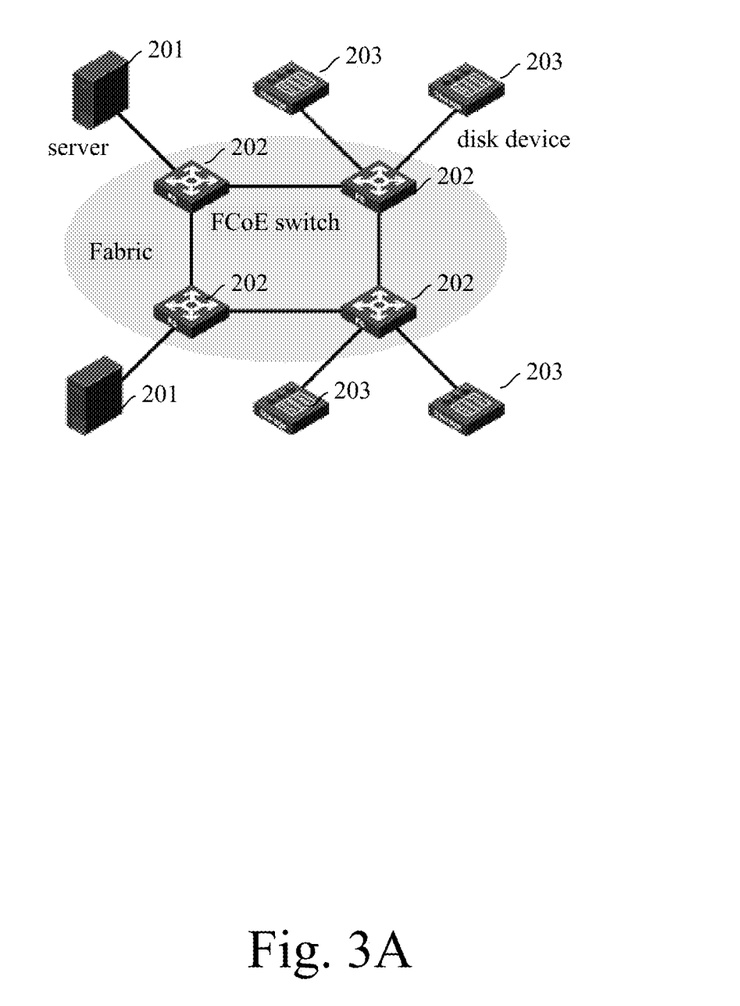
FIG. 3A is a schematic diagram illustrating a network environment in which aspects of the present disclosure may be implemented according to an example.

FIG. 3A shows a network environment in which aspects of the present disclosure are implemented according to an example. As shown in FIG. 3A, a plurality of FCoE switches 202 constitutes a fabric network. Some FCoE switches 202 are connected with a server 201, and some FCoE switches 202 are connected with a disk device 203. Each FCoE switch 202 saves a VSAN-VLAN mapping table in local memory, and the server 201 may realize a unified management for a VSAN-VLAN mapping table of each FCoE switch 202 in the same fabric network by using the method for managing mapping provided in this example.

Figure 3B:
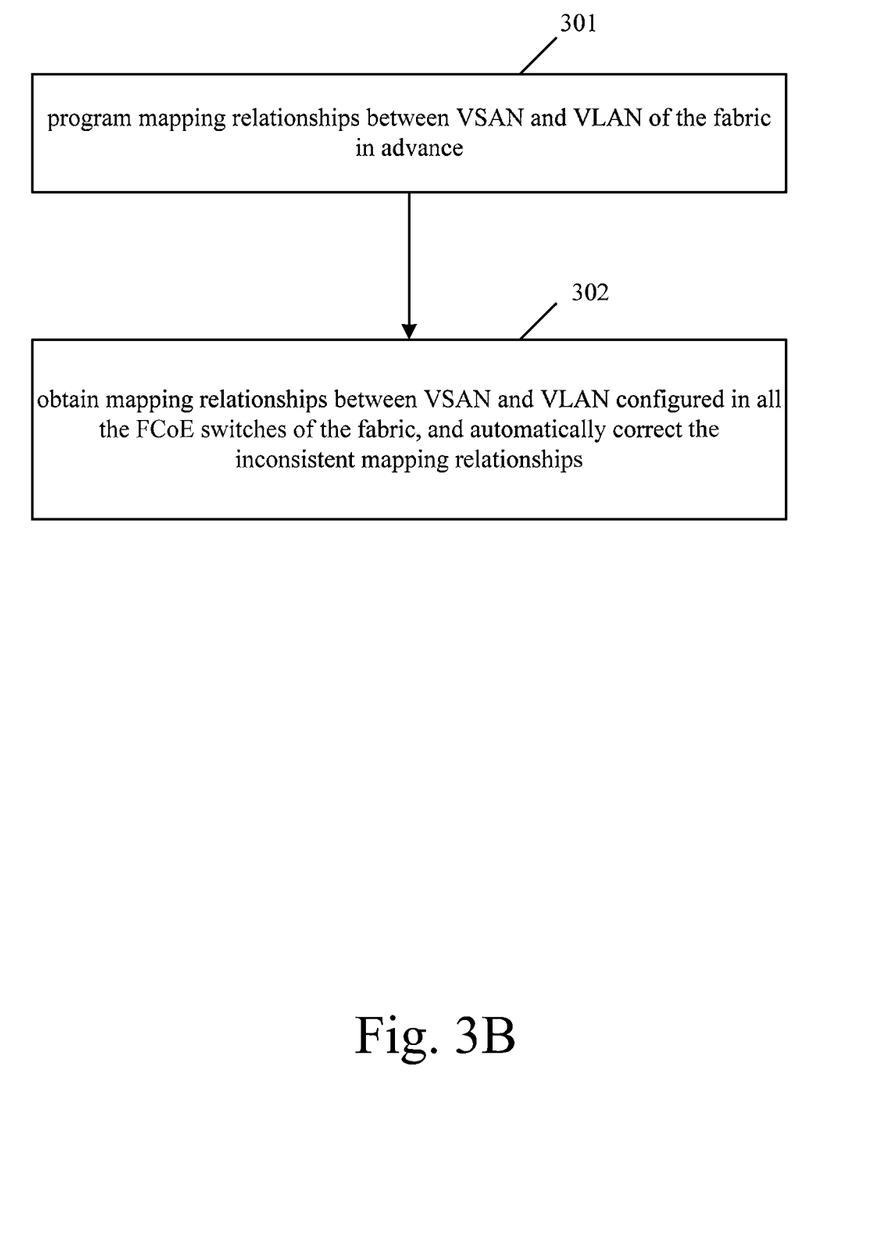
FIG. 3B is a flow chart of a method for managing mapping according to an example.

Referring to FIG. 3B, there is shown a flow chart of a method for managing mapping according to an example. As shown in FIG. 3B, the flow chart may include the following blocks:

Block 301: program mapping relationships between the VSANs and the VLANs of the fabric in advance.

The programmed-in-advance mapping relationships between the VSANs and the VLANs of the fabric (hereafter referred to as simply "programmed-in-advance mapping relationship") is programmed by the user according to service demands, and includes mapping relationships between the VSANs and the VLANs programmed in advance for each FCoE switch needed by the fabric. By way of example in which the fabric is determined to require five FCoE switches according to service demands, then at block 301, mapping relationships between VSAN and VLAN required by the five FCoE switches are programmed.

Block 302: obtain mapping relationships between the VSANs and the VLANs configured in all of the current FCoE switches of the fabric. When the obtained mapping relationships are inconsistent with the programmed-in-advance mapping relationships, the inconsistent mapping relationships are automatically corrected according to the programmed-in-advance mapping relationships, so that mapping relationships between the VSAN and the VLAN of each FCoE switch of the fabric are consistent with mapping relationships between the VSAN and the VLAN programmed in advance for each FCoE switch.

Here, all of the current FCoE switches of the fabric perhaps do not cover all the FCoE switches needed by the fabric. For example, the fabric may be determined as needing five FCoE switches according to service demands, but before performance of block 302, the fabric may have only three of the five FCoE switches, and the other two FCoE switches may be added into the fabric later. When newly adding an FCoE switch into the fabric, mapping relationships between the VSAN and the VLAN programmed in advance for the newly-added FCoE switch may be obtained from the programmed-in-advance mapping relationships. When the newly-added FCoE switch is not configured with the VSAN and/or the VLAN in the obtained mapping relationship, the newly-added FCoE switch is configured with the VSAN and/or the VLAN in the obtained mapping relationship, and is then configured with the obtained mapping relationship. Of course, if the newly-added FCoE switch is not one of the FCoE switches that are needed by the fabric, then the current procedure is directly terminated or the processing procedure of adding an FCoE switch in the first example is performed.

In block 302, obtaining mapping relationships between the VSAN and the VLAN of all of the current FCoE switches of the fabric may be performed regularly, and/or, be performed under triggering of an operation. Here, the operation may be performed by the user at any time according to service demands, and specifically may include: updating the mapping relationships programmed in advance in block 301 (the updating may be re-programming mapping relationships between the VSAN and the VLAN of the fabric, or modifying some of the programmed-in-advance mapping relationships), and/or modifying at least one of the processing strategies set by the user.

In block 302, a determination as to whether the obtained mapping relationships are consistent with the programmed-in-advance mapping relationships may be made through the following operations:

for each FCoE switch of the fabric, when mapping relationships between the VSAN and the VLAN programmed in advance for the FCoE switch was failed to be obtained from the FCoE switch, a determination that the obtained mapping relationships are inconsistent with the programmed-in-advance mapping relationships is made, where the inconsistent mapping relationships include the failed-to-be-obtained mapping relationships between the VSAN and the VLAN programmed in advance for the FCoE switch;

when a determination that mapping relationships obtained from the FCoE switch are incorrect according to mapping relationships between the VSAN and the VLAN programmed in advance for the FCoE switch is made, a determination that the obtained mapping relationships are inconsistent with the programmed-in-advance mapping relationships is made, where the inconsistent mapping relationships include the incorrect mapping relationships;

when a determination that superfluous mapping relationships are obtained from the FCoE switch according to the mapping relationships between the VSAN and the VLAN programmed in advance for the FCoE switch are made, then a determination that the obtained mapping relationships are inconsistent with the programmed-in-advance mapping relationships, where the inconsistent mapping relationships include the superfluous mapping relationships.

In addition, in this example, before automatically correcting the inconsistent mapping relationships according to the programmed-in-advance mapping relationships in block 302, block 302 may further include: determining whether a processing strategy set by the user is to automatically correct the inconsistent mapping relationships or to provide the inconsistent mapping relationships for the user. If a determination that the user is to automatically correct the inconsistent mapping relationships is made, the inconsistent mapping relationships are automatically corrected according to the programmed-in-advance mapping relationships as described above in block 302. If a determination that the inconsistent mapping relationships are to be provided to the user, the inconsistent mapping relationships for the user are provided, so that the user may then determine how to deal with the inconsistent mapping relationships.

Based on the inconsistent mapping relationships described above, automatically correcting the inconsistent mapping relationships according to the programmed-in-advance mapping relationships in this example may include: when the inconsistent mapping relationships include a mapping relationship between the VSAN and the VLAN programmed in advance for an FCoE switch that was failed to be obtained from the FCoE switch, configuring the FCoE switch with the failed-to-be-obtained mapping relationship; when the inconsistent mapping relationships include an incorrect mapping relationship that is obtained from an FCoE switch, deleting the incorrect mapping relationship and configuring the FCoE switch with a correct mapping relationship; when the inconsistent mapping relationships include a superfluous mapping relationship that is not programmed in advance for an FCoE switch, deleting the superfluous mapping relationship.

It should be noted that when configuring the FCoE switch with a mapping relationship, if the VSAN and/or the VLAN in the mapping relationship that is to be configured in the FCoE switch do not exist in the FCoE switch, then the FCoE switch is configured with the VSAN and/or the VLAN in the mapping relationship, and after the configuration, the FCoE switch is further configured with the mapping relationship.

Based on the inconsistent mapping relationships described above, the above-mentioned block of the user determining how to deal with the inconsistent mapping relationships may be implemented in two modes:

Implementation mode (1) which may include:
determining whether the inconsistent mapping relationships are needed by the network;
if a determination that the inconsistent mapping relationships are needed by the network is made, when the inconsistent mapping relationships include a mapping relationship between the VSAN and the VLAN programmed in advance for the FCoE switch that was failed to be obtained from the FCoE switch, determining whether to configure the FCoE switch with the failed-to-be-obtained mapping relationship according to practical situations of the network, and when the inconsistent mapping relationships include an incorrect mapping relationship obtained from the FCoE switch and/or a superfluous mapping relationship that is not programmed in advance for the FCoE switch, modifying the programmed-in-advance mapping relationships of the fabric according to the inconsistent mapping relationships, and modifying mapping relationships of other FCoE switches of the fabric according to the modified mapping relationship of the fabric.
if a determination that the inconsistent mapping relationships are not needed by the network is made, when the inconsistent mapping relationships include a mapping relationship between the VSAN and the VLAN programmed in advance for the FCoE switch that was failed to be obtained from the FCoE switch, modifying the programmed-in-advance mapping relationships of the fabric according to the inconsistent mapping relationships, for example, deleting the inconsistent mapping relationships from the programmed-in-advance mapping relationships of the fabric and modifying mapping relationships of other FCoE switches of the fabric according to the modified mapping relationships of the fabric; when the inconsistent mapping relationships include an incorrect mapping relationship obtained from the FCoE switch, and/or a superfluous mapping relationship that is not programmed in advance for the FCoE switch, determining whether to delete the inconsistent mapping relationship according to practical situations of the network.

Implementation mode (2) which is similar to the automatically-correcting strategy and specifically may include: when the inconsistent mapping relationships include a mapping relationship programmed in advance for the FCoE switch that was not obtained from the FCoE switch, determining by the user whether to configure the FCoE switch with the failed-to-be-obtained mapping relationship; when the inconsistent mapping relationships include an incorrect mapping relationship obtained from the FCoE switch, deleting the incorrect mapping relationship and configuring the FCoE switch with a correct mapping relationship by the user; when the inconsistent mapping relationships include a superfluous mapping relationship that was not programmed in advance for the FCoE switch, providing the superfluous mapping relationship (the superfluous mapping relationship is identified with a superfluous status marker) for the user, and determining by the user whether to delete the superfluous mapping relationship.

It should be noted that when configuring the FCoE switch with a mapping relationship, if the VSAN and/or the VLAN of the mapping relationship that is to be configured in the FCoE switch do not exist in the FCoE switch, then the FCoE switch is configured with the VSAN and/or the VLAN in the mapping relationship, and after the configuration, the FCoE switch is further configured with the mapping relationship.

It should be noted that in the above block 301, in order to ensure that the user can visually and clearly look over the programmed-in-advance mapping relationships between the VSAN and the VLAN of the fabric, block 301 may further include displaying the programmed-in-advance mapping relationships and markers with which the mapping relationships are identified, where, for each mapping relationship, when the mapping relationship is programmed for all the FCoE switches of the fabric, the mapping relationship is identified with a first marker that is to show that the mapping relationship is programmed for all the FCoE switches of the fabric; when the mapping relationship is programmed for some FCoE switches, then the mapping relationship is identified with a second marker that is to show that each of the FCoE switches that the mapping relationship is programmed for may be acquired through triggering of the second marker. The programmed-in-advance mapping relationships and the markers with which the mapping relationships are identified may be displayed in the form of a table. It can be seen, in this example, that the information of the FCoE switches needed by the fabric is not directly displayed, and only a table of the programmed-in-advance mapping relationships between the VSAN and the VLAN of the fabric is displayed, i.e., using the table of the programmed-in-advance mapping relationships between the VSAN and the VLAN of the fabric to replace a table of mapping relationships between the VSAN and the VLAN on each FCoE switch of the fabric, as compared with FIG. 1, may greatly reduce table resources.

The following will describe an apparatus for managing mapping according to an example.

Figure 4:
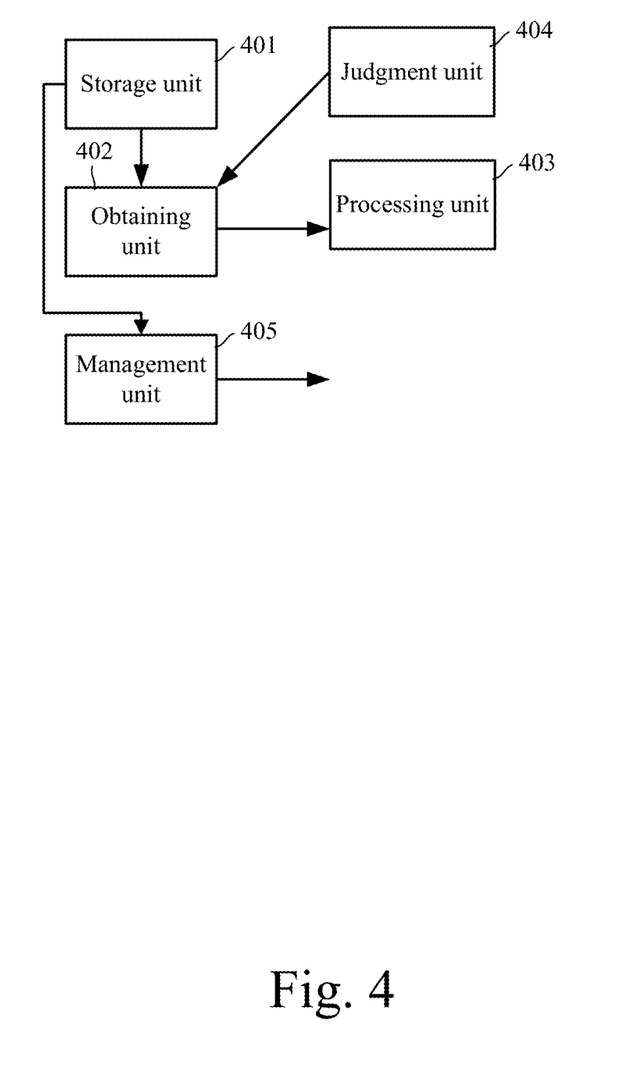
FIG. 4 is a block diagram of an apparatus for managing mapping according to an example.

Referring to FIG. 4, there is shown a block diagram of an apparatus for managing mapping between the VSAN and the VLAN of the fabric according to an example. As shown in FIG. 4, this apparatus may include:
a storage unit 401 to store programmed-in-advance mapping relationships between the VSANs and the VLANs of the fabric, where the programmed-in-advance mapping relationships include mapping relationships between the VSANs and the VLANs programmed in advance for each FCoE switch needed by the fabric;
an obtaining unit 402 to obtain mapping relationships between the VSANs and the VLANs configured in all the FCoE switches of the fabric, and to send a processing message to a processing unit 403 when the obtained mapping relationships are inconsistent with the programmed-in-advance mapping relationships;
wherein the processing unit 403 is to automatically correct the inconsistent mapping relationships according to the programmed-in-advance mapping relationships after receiving the processing message, so that the mapping relationships between the VSAN and the VLAN of each FCoE switch of the fabric are consistent with the mapping relationships between the VSAN and the VLAN programmed in advance for each FCoE switch.

The obtaining unit 402 may obtain the mapping relationships between the VSAN and the VLAN configured in all of the FCoE switches of the fabric regularly and/or under triggering of an operation. The operation includes updating the mapping relationships programmed in advance and updating at least one of processing strategies set by a user.

As shown in FIG. 4, the apparatus may further include:
a judgment unit 404 to determine whether a processing strategy set by the user is to automatically correct the inconsistent mapping relationships or to provide the inconsistent mapping relationships for the user after the obtaining unit 402 determines that the obtained mapping relationships are inconsistent with the programmed-in-advance mapping relationships and before the obtaining unit 402 sends the processing message; if it is determined that the processing strategy set by the user is to automatically correct the inconsistent mapping relationships, then to trigger the obtaining unit 402 to send the processing message, if it is determined that the processing strategy set by the user is to provide the inconsistent mapping relationships for the user after the obtaining unit 402 determines that the obtained mapping relationships are inconsistent with the programmed-in-advance mapping relationships and before the obtaining unit 402 sends the processing message, then to provide the inconsistent mapping relationships for the user, so that the user determines how to deal with the inconsistent mapping relationships.

In this example, the obtaining unit 402 obtains the mapping relationships that are inconsistent with the programmed-in-advance mapping relationships by:
for each FCoE switch of the fabric,
when a mapping relationship between the VSAN and the VLAN programmed in advance for the FCoE switch was not obtained from the FCoE switch, then determining that the obtained mapping relationships are inconsistent with the programmed-in-advance mapping relationships; the inconsistent mapping relationships including the mapping relationship between the VSAN and the VLAN programmed in advance for the FCoE switch which was not obtained;
when it is determined that a mapping relationship obtained from the FCoE switch is incorrect according to the mapping relationships between the VSAN and the VLAN programmed in advance for the FCoE switch, determining that the obtained mapping relationships are inconsistent with the programmed-in-advance mapping relationships; the inconsistent mapping relationships including the incorrect mapping relationship;
when it is determined that a superfluous mapping relationship is obtained from the FCoE switch according to the mapping relationships between the VSAN and the VLAN programmed in advance for the FCoE switch, determining that the obtained mapping relationships are inconsistent with the programmed-in-advance mapping relationships; the inconsistent mapping relationships including the superfluous mapping relationship.

In the above example, when the inconsistent mapping relationships include the mapping relationship programmed in advance for the current FCoE switch which was not obtained from the FCoE switch, the processing unit 403 configures the FCoE switch with the failed-to-be-obtained mapping relationship; when the inconsistent mapping relationships include the incorrect mapping relationship obtained from the FCoE switch, the processing unit 403 deletes the incorrect mapping relationship and configures the FCoE switch with a correct mapping relationship; when the inconsistent mapping relationships include the superfluous mapping relationship that is not programmed in advance for the FCoE switch, the processing unit 403 deletes the superfluous mapping relationship. It should be noted that when configuring the FCoE switch with a mapping relationship, if the VSAN and/or the VLAN in the mapping relationship that is to be configured in the FCoE switch does not exist in the FCoE switch, then the FCoE switch is configured with the VSAN and/or the VLAN in the mapping relationship that is not configured in the FCoE switch, after the configuration, the FCoE switch is further configured with the mapping relationship.

As shown in FIG. 4, the apparatus may further include:
a management unit 405, when an FCoE switch is added into the fabric, to obtain mapping relationships between a VSAN and a VLAN programmed in advance for the newly-added FCoE switch from the programmed-in-advance mapping relationships; and when the newly-added FCoE switch is not configured with a VSAN and/or a VLAN in the obtained mapping relationships, to configure the newly-added FCoE switch with the VSAN and/or the VLAN in the obtained mapping relationships and to further configure the newly-added FCoE switch with the obtained mapping relationships.

It can be seen that the above examples may achieve the following effects:
(1) through only displaying the programmed-in-advance mapping relationships, the user may visually and clearly look over the mapping relationships between the VSANs and the VLANs of the fabric, and this facilitates modifying and re-programming of the mapping relationships between the VSANs and the VLANs of the fabric;
(2) the system may determine whether the obtained mapping relationships are consistent with the programmed-in-advance mapping relationships between the VSANs and the VLANs of the fabric. As such, a user need not manually make this determination one by one according to the table shown in FIG. 1. In one regard, the examples disclosed herein enable rapid judgment of whether there is an inconsistent mapping relationship in the fabric and rapid positioning of the inconsistent mapping relationship;
(3) through the processing strategies set by the user, rapid batch correction of the inconsistent mapping relationships may be realized; further, automatic correction of the inconsistent mapping relationships may be realized, and manual processing the inconsistent mapping relationships by the user may also be realized;
(4) when an FCoE switch is added into the fabric, mapping relationships between the VSAN and the VLAN that are consistent with those programmed for the fabric may be automatically configured in the newly-added FCoE switch; and
(5) when the mapping relationships between a VSAN and a VLAN of the FCoE switch of the network are artificially modified, the mapping relationships between the VSAN and the VLAN of the FCoE switch may be automatically corrected according to those programmed for the fabric in order to guarantee normal operations of the network.

It can be seen from the above examples, the examples do not depend on the user's manual operations to automatically correct mapping relationships between a VSAN and a VLAN configured on the FCoE switch that are inconsistent with the mapping relationships between the VSAN and the VLAN programmed for the fabric, which may completely avoid the problems, such as, errors, omissions, etc., caused by the user's manual operation.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the units, modules or operations shown in the figures are not necessarily essential for implementing the present disclosure. Moreover, the sequence numbers of the above examples are only for description, and do not indicate an example is more superior to another.

Those skilled in the art can understand that the units or modules in the device in the example can be arranged in the device in the example as described in the example, or can be alternatively located in one or more devices different from that in the example. The modules in the aforesaid example can be combined into one module or further divided into a plurality of sub-modules.

Although the flow diagrams described above show a specific order of execution, the order of execution may differ from that which is depicted. For example, the order of execution of two or more blocks may be scrambled relative to the order shown. Also, two or more blocks shown in succession may be executed concurrently or with partial concurrence The methods described above may be stored as machine readable instructions in a memory and/or stored on a storage medium. Examples of a storage medium for storing the machine readable instructions include a floppy disk, a hard disk, a magnetic disk, compact disk (e.g., CD-ROM, CD-R, CD-RW, DVD-ROM, DVD-RAM, DVD-RW and DVD+RW), a tape, a nonvolatile memory card and ROM). Optionally, it is possible to download the machine readable instructions from a server computer via a communication network.

Figure 5:
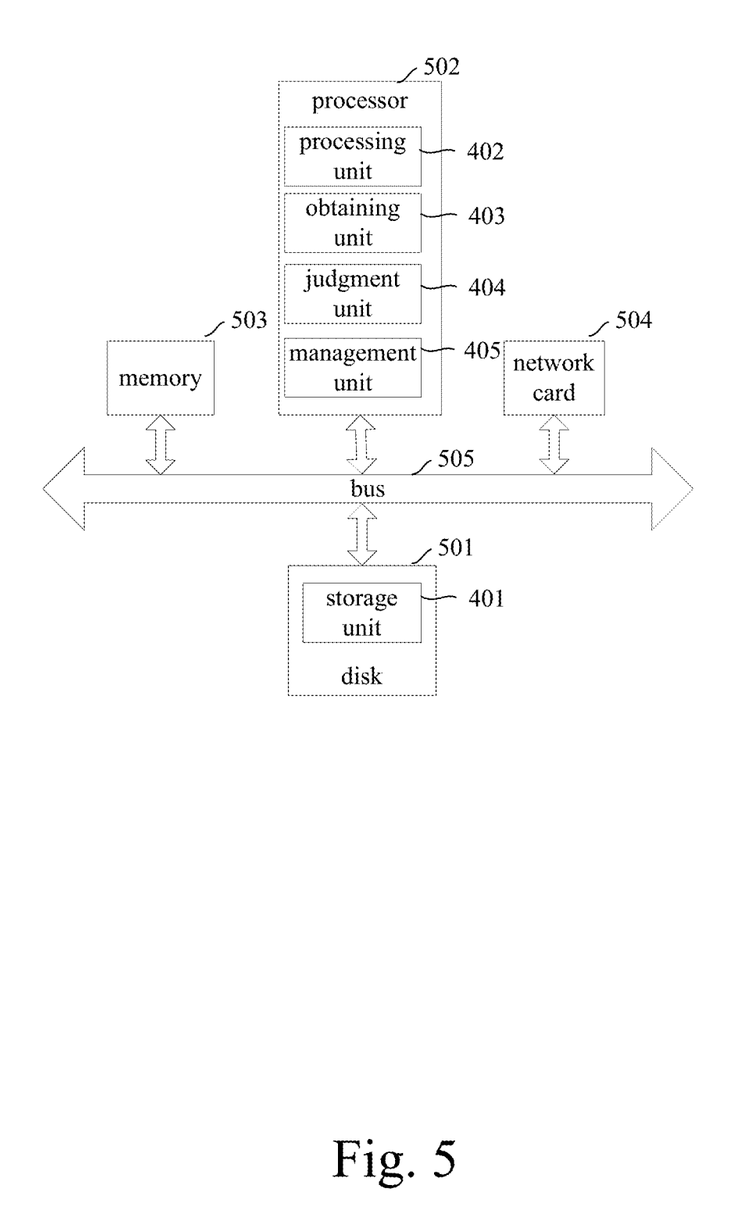
FIG. 5 is a block diagram of an apparatus for managing mapping according to an example.

Based on the apparatus for managing mapping provided in the above examples, an example of an apparatus for managing mapping is provided. As shown in FIG. 5, this apparatus for managing mapping is a computer system that includes: a disk 501, a processor 502, a memory 503, a network card 504 and a bus 505. The disk 501, the processor 502, the memory 503, the network card 504 communicate with each other through the bus 505. The disk 501 includes the aforementioned storage unit 401; the processor 502 includes the aforementioned processing unit 402 and obtaining unit 403, and may further include the judgment unit 404 and the management unit 405. The disk 501 stores a software program according to the method for managing mapping of the above-mentioned example. When the system is started, an instruction of the software program is loaded into the memory 503; the processor 502 reads the instruction from the memory 503 and executes the instruction, thus completing the function of managing mapping, i.e., the functions of the processing unit 402, the obtaining unit 403, the judgment unit 404 and the management unit 405 mentioned above. When the processing unit 402 of the processor 502 obtains the mapping relationship, the processing unit 402 obtains the mapping relationships between the VSANs and the VLANs from all the FCoE switches of the fabric through the network card 504; when the processing unit 403 of the processor 502 updates the mapping relationships of the FCoE switch, the processing unit 403 uses the network card 504 to communicate with a corresponding FCoE switch to finish updating of the mapping relationships between the VSAN and the VLAN of the FCoE switch; when the processing unit 403 of the processor 502 updates the mapping relationships locally, the processing unit 403 updates the mapping relationships between the VSAN and the VLAN stored in the storage unit 401 of the disk 501 through the bus 505; when the management unit 405 of the processor 502 newly adds an FCoE switch into the fabric, the management unit 405 obtains mapping relationships between the VSAN and the VLAN programmed in advance for the newly-added FCoE switch from the programmed-in-advance mapping relationships stored in the storage unit 401 of the disk 501, and when the newly-added FCoE switch is not configured with a VSAN and/or a VLAN in the obtained mapping relationships, the newly-added FCoE switch is configured with the VSAN and/or the VLAN of the obtained mapping relationships as well as the obtained mapping relationships through the network card 504.

What has been described and illustrated herein are examples of the disclosure along with some of their variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing mapping in a network, comprising:
    programming in advance mapping relationships between a Virtual Storage Area Network (VSAN) and a Virtual Local Area Network (VLAN) of a fabric for each Fiber Channel over Ethernet (FCoE) switch needed by the fabric;
    obtaining, by a server, from the FCoE switches, mapping relationships between VSANs and VLANs configured in all FCoE switches of the fabric;
    determining, by the server, that the mapping relationships obtained from the FCoE switches are inconsistent with the programmed-in-advance mapping relationships, wherein the inconsistent mapping relationships comprise a mapping relationship obtained from one of the FCoE switches that is incorrect with respect to the mapping relationships programmed in advance for the FCoE switch; and
    at least one of:
        automatically updating the mapping relationships between the VSANs and the VLANs configured in the FCoE switches corresponding to the inconsistent mapping relationships, and
        automatically updating the mapping relationships between the VSANs and the VLANs programmed in advance for the FCoE switches corresponding to the inconsistent mapping relationships, so that the mapping relationships between the VSANs and the VLANs configured in each FCoE switch of the fabric are consistent with the mapping relationships between the VSANs and the VLANs programmed in advance for each FCoE switch of the fabric.

2. The method of claim 1, wherein obtaining the mapping relationships further comprises obtaining the mapping relationships between the VSANs and the VLANs configured in all the FCoE switches of the fabric at least one of regularly and under triggering of a pre-determined operation;
  wherein the pre-determined operation comprises updating the programmed-in-advance mapping relationships and processing at least one strategy set by a user.

3. The method of claim 1, further comprising:
determining whether a processing strategy set by a user is to automatically update the inconsistent mapping relationships or to provide the inconsistent mapping relationships for the user;
in response to determining that the processing strategy is to automatically update the inconsistent mapping relationships, at least one of:
  automatically updating the mapping relationships between the VSANs and the VLANs configured in the FCoE switches corresponding to the inconsistent mapping relationships, and
  automatically updating the mapping relationships between the VSANs and the VLANs programmed in advance for the FCoE switches corresponding to the inconsistent mapping relationships; and
in response to determining that the processing strategy is to provide the inconsistent mapping relationships for the user, providing the inconsistent mapping relationships for the user, wherein the user is to update at least one of:
  the mapping relationships between the VSANs and the VLANs configured in the FCoE switches corresponding to the inconsistent mapping relationships, and
  the mapping relationships between the VSANs and the VLANs programmed in advance for the FCoE switches corresponding to the inconsistent mapping relationships.

4. The method of claim 1, further comprising:
when an FCoE switch is being newly added into the fabric, obtaining mapping relationships between a VSAN and a VLAN programmed in advance for the newly-added FCoE switch from the programmed-in-advance mapping relationships;
when the newly-added FCoE switch is not configured with the VSAN or the VLAN in the obtained mapping relationships, configuring the newly-added FCoE switch with the VSAN or the VLAN in the obtained mapping relationships and configuring the newly-added FCoE switch with the obtained mapping relationships.

5. The method of claim 1, further comprising:
displaying the programmed-in-advance mapping relationships and markers with which the programmed-in-advance mapping relationships are identified;
wherein, for each displayed programmed-in-advance mapping relationship,
  when the mapping relationship is programmed for all the FCoE switches of the fabric, identifying the mapping relationship with a first marker that is to show that the mapping relationship is programmed for all the FCoE switches of the fabric; and
  when the mapping relationship is programmed for some of the FCoE switches, identifying the mapping relationship with a second marker that is to show that each FCoE switch for which the mapping relationship is programmed is to be acquired through triggering of the second marker.

6. An apparatus for managing mapping in a network, comprising:
a server including a storage unit, a processor, a memory and a network card, wherein the memory is to store instructions executable for the processor; wherein,
the storage unit is to store programmed-in-advance mapping relationships between a Virtual Storage Area Network (VSAN) and a Virtual Local Area Network (VLAN) of a fabric, the programmed-in-advance mapping relationships comprise mapping relationships between the VSAN and the VLAN programmed in advance for each FCoE switch needed by the fabric;
while the instructions stored in the memory are executed by the processor, the processor is to obtain, from the FCoE switches, mapping relationships between VSANs and VLANs configured in the FCoE switches of the fabric through the network card, and when the obtained mapping relationships are inconsistent with the programmed-in-advance mapping relationships stored in the storage unit, wherein the inconsistent mapping relationships comprise a mapping relationship obtained from one of the FCoE switches that is incorrect with respect to the mapping relationships programmed in advance for the FCoE switch, the processor is to at least one of:
  update through the network card, the mapping relationships between the VSANs and the VLANs configured in the FCoE switches corresponding to the inconsistent mapping relationships, and
  update the mapping relationships between the VSANs and the VLANs programmed in advance for the FCoE switches corresponding to the inconsistent mapping relationships that are stored in the storage unit, so that the mapping relationships between the VSAN and the VLAN configured in each FCoE switch of the fabric are consistent with the mapping relationships between the VSAN and the VLAN programmed in advance for each FCoE switch that are stored in the storage unit.

7. The apparatus of claim 6, wherein the processor is to obtain the mapping relationships between the VSANs and the VLANs configured in all the FCoE switches of the fabric at least one of regularly and under triggering of a pre-determined operation;
  wherein the pre-determined operation comprises updating the programmed-in-advance mapping relationships and processing at least one strategy set by a user.

8. The apparatus of claim 6, wherein while the instructions stored in the memory are executed by the processor,
the processor is further to determine whether a processing strategy set by a user is to automatically correct the inconsistent mapping relationships or to provide the inconsistent mapping relationships for the user;
in response to determining that the processing strategy set is to automatically correct the inconsistent mapping relationships, the processor is to at least one of:
  update, through the network card, the mapping relationships between the VSANs and the VLANs configured in the FCoE switches corresponding to the inconsistent mapping relationships, and
  update the mapping relationships between the VSANs and the VLANs programmed in advance for the FCoE switches corresponding to the inconsistent mapping relationships that are stored in the storage unit, so that the mapping relationships between the VSAN and the VLAN configured in each FCoE switch of the fabric are consistent with the mapping relationships between the VSAN and the VLAN programmed in advance for each FCoE switch that are stored in the storage unit;

in response to determining that the processing strategy is to provide the inconsistent mapping relationships for the user, the processor is to provide the inconsistent mapping relationships for the user, wherein the user is to update at least one of:

the mapping relationships between the VSANs and the VLANs configured in the FCoE switches corresponding to the inconsistent mapping relationships, and the mapping relationships between the VSANs and the VLANs programmed in advance for the FCoE switches corresponding to the inconsistent mapping relationships which are stored in the storage unit.

9. The apparatus of claim 6, wherein while the instructions stored in the memory are executed by the processor, the processor is to, when an FCoE switch is newly added into the fabric, obtain mapping relationships between a VSAN and a VLAN programmed in advance for the newly-added FCoE switch from the programmed-in-advance mapping relationships that are stored in the storage unit; and the processor is to, when the newly-added FCoE switch is not configured with the VSAN or the VLAN in the obtained mapping relationships, configure the newly-added FCoE switch with the VSAN or the VLAN in the obtained mapping relationships through the network card and configure the newly-added FCoE switch with the obtained mapping relationships through the network card.

10. A computer system to manage mapping in a network, the computer system comprising:

a storage device that stores programmed-in-advance mapping relationships between a Virtual Storage Area Network (VSAN) and a Virtual Local Area Network (VLAN) of a fabric, the programmed-in-advance mapping relationships comprising mapping relationships between the VSAN and the VLAN programmed in advance for FCoE switches for the fabric;

at least one processor that obtains, from the FCoE switches, mapping relationships between VSANs and VLANs configured in the FCoE switches, and if the obtained mapping relationships are inconsistent with the stored programmed-in-advance mapping relationships, wherein the inconsistent mapping relationships comprise a mapping relationship obtained from one of the FCoE switches that is incorrect with respect to the mapping relationships programmed in advance for the FCoE switch, the at least one processor performs to at least one of:

updating the mapping relationships between the VSANs and the VLANs configured in the FCoE switches corresponding to the inconsistent mapping relationships, and updating the mapping relationships between the VSANs and the VLANs programmed in advance for the FCoE switches corresponding to the inconsistent mapping relationships, so that the mapping relationships between the VSAN and the VLAN configured in each of the FCoE switches are consistent with the mapping relationships between the VSAN and the VLAN programmed in advance for each FCoE switch that are stored in the storage device.

11. The computer system of claim 10, wherein the at least one processor obtains the mapping relationships between the VSANs and the VLANs configured in the FCoE switches at least one of regularly and under triggering of a pre-determined operation;

wherein the pre-determined operation comprises updating the programmed-in-advance mapping relationships and processing at least one strategy set by a user.

12. The computer system of claim 10, wherein the at least one processor determines whether a processing strategy set by a user is to automatically correct the inconsistent mapping relationships or to provide the inconsistent mapping relationships for the user.

13. The computer system of claim 12, wherein in response to determining that the processing strategy set is to automatically correct the inconsistent mapping relationships, the at least one processor performs at least one of:

updating the mapping relationships between the VSANs and the VLANs configured in the FCoE switches corresponding to the inconsistent mapping relationships, and updating the mapping relationships between the VSANs and the VLANs programmed in advance for the FCoE switches corresponding to the inconsistent mapping relationships; and in response to determining that the processing strategy is to provide the inconsistent mapping relationships for the user, the at least one processor provides the inconsistent mapping relationships for the user, wherein the user is to update at least one of:

the mapping relationships between the VSANs and the VLANs configured in the FCoE switches corresponding to the inconsistent mapping relationships, and the mapping relationships between the VSANs and the VLANs programmed in advance for the FCoE switches corresponding to the inconsistent mapping relationships.

14. The computer system of claim 10, wherein if an FCoE switch is newly added into the fabric, the at least one processor obtains mapping relationships between a VSAN and a VLAN programmed in advance for the newly-added FCoE switch from the stored programmed-in-advance mapping relationships; and if the newly-added FCoE switch is not configured with the VSAN or the VLAN in the obtained mapping relationships, the at least one processor configures the newly-added FCoE switch with the VSAN or the VLAN in the obtained mapping relationships.

* * * * *